(12) United States Patent
Thomson et al.

(10) Patent No.: US 6,641,789 B1
(45) Date of Patent: Nov. 4, 2003

(54) DEVICE AND METHOD FOR DECOMPOSING NITROGEN OXIDES

(75) Inventors: James Thomson, Dundee (GB); Steven Paul Scott, Fife (GB)

(73) Assignee: University of Dundee, Dundee (GB)

( * ) Notice: Subject to any disclaimer, the term of this patent is extended or adjusted under 35 U.S.C. 154(b) by 0 days.

(21) Appl. No.: 09/719,377

(22) PCT Filed: Jun. 11, 1999

(86) PCT No.: PCT/GB99/01865

§ 371 (c)(1), (2), (4) Date: Feb. 22, 2001

(87) PCT Pub. No.: WO99/64136

PCT Pub. Date: Dec. 16, 1999

(30) Foreign Application Priority Data

Jun. 11, 1998 (GB) ............................................. 9812459
Jun. 11, 1998 (GB) ............................................. 9812460

(51) Int. Cl.[7] ............................. B01D 53/56; B01J 8/04
(52) U.S. Cl. .................... 423/239.1; 422/190; 422/194; 422/211
(58) Field of Search ................................ 422/172, 177, 422/190, 194, 211; 423/239.1

(56) References Cited

U.S. PATENT DOCUMENTS 4,912,776 A * 3/1990 Alcorn ..................... 423/239.1

FOREIGN PATENT DOCUMENTS

| DE | 36 44 090 A | 7/1988 | ........... B01D/53/34 |
|---|---|---|---|
| DE | 195 27 693 C | 10/1996 | ............. F01N/3/10 |
| EP | 0 283 913 A | 9/1988 | ........... B01D/53/36 |
| EP | 0 566 071 A | 10/1993 | ........... B01D/53/36 |
| FR | 2 368 987 A | 5/1978 | ........... B01D/53/34 |

OTHER PUBLICATIONS

International Search Report, PCT/GB99/01865.

\* cited by examiner

*Primary Examiner*—Stanley S. Silverman
*Assistant Examiner*—Maribel Medina
(74) *Attorney, Agent, or Firm*—Myers Bigel Sibley & Sajovec, PA

(57) ABSTRACT

A device for decomposing the oxides of nitrogen ($No_x$) contained in effluent compositions, such as the exhaust gases generated by automotive combustion engines, is described. In one embodiment, the device includes a reaction chamber containing an oxidisable material which when the device is in use will undergo an oxidation/reduction reaction with nitrogen oxides of nitrogen oxidation states greater than 2, especially nitrogen dioxide, to generate nitrogen and an oxide of the oxidisable material. The oxidisable material is regenerated using an electromotive force. In a particularly preferred embodiment, the reaction chamber containing the oxidisable material is associated with a further reaction chamber which is arranged upstream of the reaction chamber containing the oxidisable material. This further reaction chamber contains an oxidation catalyst which is able to oxidize nitric oxide (NO) to nitrogen dioxide ($NO_2$) or other nitrogen oxides having a nitrogen oxidation state greater than 2. also described are processes for decomposing nitrogen oxides.

38 Claims, No Drawings

DEVICE AND METHOD FOR DECOMPOSING NITROGEN OXIDES

This application claims priority from G.B. Patent Application No. 9812459.7, filed Jun. 11, 1998 and G.B. Patent Application No. 9812460.5, filed Jun. 11, 1998, the disclosures of which are incorporated by reference herein in their entirety.

The present invention relates to a device for decomposing the oxides of nitrogen and more particularly to a device for removing the oxides of nitrogen contained in gaseous effluents, such as the exhaust gases generated by automotive combustion engines. The present invention also relates to a process for decomposing these oxides, e.g. using such a device.

The use of catalytic devices in vehicle exhaust systems to remove the oxides of nitrogen ($NO_x$) contained in the exhaust gases is well known. These devices, which are more commonly referred to as catalytic converters, typically comprise a surrounding metal shell or casing which houses a ceramic or metal monolith. The ceramic or metal monolith comprises a plurality of parallel flow channels which contain a catalytic material for catalysing the reduction of the nitrogen oxides to molecular nitrogen. In use, the exhaust gas generated by the engine is conveyed through the flow channels in the monolith so that it contacts the catalytic material.

We have now developed a device which is able to decompose the oxides of nitrogen ($NO_x$) contained in effluent compositions, such as the exhaust gases generated by automotive combustion engines. In one embodiment, the device is able to reduce nitrogen oxides of nitrogen oxidation states greater than 2 and especially nitrogen dioxide ($NO_2$), to molecular nitrogen. We have also developed a process for reducing nitrogen oxides of nitrogen oxidation states greater than 2 to molecular nitrogen which uses such a device.

According to a first aspect of the present invention there is provided a device for decomposing a nitrogen oxide(s) of nitrogen oxidation state greater than 2, especially nitrogen dioxide, comprising a reaction chamber, an oxidisable material contained in the reaction chamber which in use will undergo an oxidation/reduction reaction with the nitrogen oxide(s) to generate nitrogen and an oxide(s) of the oxidisable material.

According to a second aspect of the present invention there is provided a process for decomposing a nitrogen oxide(s) of nitrogen oxidation state greater than 2, especially nitrogen dioxide, which comprises passing the nitrogen oxide(s) through a reaction chamber where it is contacted with an oxidisable material at a temperature in the range of from 100 to 1000° C. so as to at least partially reduce the nitrogen oxide(s) to nitrogen and oxidise at least a proportion of the oxidisable material to form an oxide(s) thereof.

The present invention in its first and second aspects is particularly concerned with the treatment of gaseous effluents containing one or more nitrogen oxides of nitrogen oxidation states greater than 2, and more particularly with the treatment of gaseous effluents containing nitrogen dioxide, such as plasma effluent gas and especially the exhaust gases which are produced by automotive combustion engines such as lean burn engines. The devices used to treat such exhaust gases are more commonly known as catalytic converters.

In the device of the first aspect of the present invention the reaction chamber is preferably enclosed by a metal shell or casing. The oxidisable material contained in the reaction chamber will preferably form a layer on a suitable substrate. Conveniently, the oxidisable material will form an outer layer on a plurality of wires, particularly metal containing, wires, which are loaded into the reaction chamber. Preferably, the wires will be knitted or otherwise joined together to form an integral wire mass, although we do not exclude the possibility that the wires may be discrete or perhaps loosely consolidated to form a wool.

The reaction chamber is provided with an inlet and outlet for the effluent composition to which conduits for conveying the composition to and from the reaction chamber may be attached.

The oxidisable material which is contained in the reaction chamber is able to reduce nitrogen oxides of nitrogen oxidation states greater than 2 and especially $NO_2$ to molecular nitrogen and is itself oxidised to form an oxide(s). As a result, the oxidisable material is gradually consumed.

Combinations of two or more oxidisable materials may be used if desired.

In a preferred embodiment, the oxidisable material contained in the reaction chamber is preferably one which will undergo an oxidation/reduction reaction with a nitrogen oxide(s) of nitrogen oxidation state greater than 2 to generate nitrogen and an oxide(s) of the oxidisable material which can be reduced in order to regenerate the oxidisable material.

In this embodiment, the device of the present invention preferably comprises means for reducing the oxide(s) so as to regenerate the oxidisable material. More particularly, the device is equipped with means for reducing the oxide(s) which is operable concurrently with the oxidation/reduction process between the oxidisable material and the nitrogen oxide(s) of nitrogen oxidation state greater than 2. In this way, the oxidisable material can be regenerated at the same time as it is consumed.

Similarly, in the process of the present invention, the oxidisable material is preferably regenerated by reducing the oxide(s) which is formed. This regeneration of the oxidisable material preferably takes place concurrently with the oxidation/reduction process.

In a particularly preferred embodiment, the oxide(s) which is formed from the oxidisable material is one which can be reduced to regenerate the oxidisable material by being subjected to an electromotive force.

Accordingly, in a third aspect of the present invention there is provided a device for decomposing a nitrogen oxide(s) of nitrogen oxidation state greater than 2, especially nitrogen dioxide, comprising a reaction chamber, an oxidisable material contained in the reaction chamber which in use will undergo an oxidation/reduction reaction with the nitrogen oxide(s) to generate nitrogen and an oxide(s) of the oxidisable material which decomposes on being subjected to an electromotive force to regenerate the oxidisable material and means for applying an electromotive force which is in electrical communication with the oxidisable material for regenerating the oxidisable material by reducing the oxide(s) which is formed.

In a fourth aspect of the present invention there is provided a process for decomposing a nitrogen oxide(s) of nitrogen oxidation state greater than 2, especially nitrogen dioxide, which comprises (1) passing the nitrogen oxide(s) through a reaction chamber where it is contacted with an oxidisable material at a temperature in the range of from 100 to 1000° C. so as to at least partially reduce the nitrogen oxide(s) to nitrogen and oxidise at least a proportion of the oxidisable material to form an oxide(s) and (2) regenerating the oxidisable material by subjecting the oxide(s) which is formed to an electromotive force.

Although the above described devices and processes may be used to reduce any oxide of nitrogen in which the nitrogen has an oxidation state greater than 2, they are particularly concerned with the reduction of effluents containing nitrogen dioxide ($NO_2$), and hereinafter these inventions will be explained with reference to nitrogen dioxide. However, any references to nitrogen dioxide or $NO_2$ should be taken to include other oxides of nitrogen in which the nitrogen has an oxidation state greater than 2 unless the context requires otherwise.

The electromotive force which is preferably applied to regenerate the oxidisable material should be a direct current. The electromotive force may be continuous or pulsed and is preferably applied concurrently with the oxidation/reduction process between the oxidisable material and the $NO_2$ so that the oxidisable material is regenerated at the same time as it is consumed.

The potential of the applied electromotive force should, of course, be sufficient to regenerate the oxidisable material by effecting the reduction of the oxide. This in turn will depend on the oxidation/reduction potential of the oxidisable material. However, oxidisable materials having low oxidation/reduction potentials are preferred and, in general, an applied electromotive force in the range of from 12 to 48 volts is suitable. When the present invention is employed in automotive applications, it is desirable to employ an oxidisable material having an oxidation/reduction potential below 12V since this represents the voltage capacity of a typical vehicle battery.

The oxidisable material is preferably a metal and more preferably is a metal having a low oxidation reduction potential, e.g. below 12 volts. Accordingly, in a preferred embodiment of the present invention the oxidation/reduction reaction with the $NO_2$ results in the production of a metal oxide(s) which is then converted back to the metal by the application of an electromotive force.

Suitable metals include tin, gold, gallium, indium, copper, zinc, platinum and palladium as well as metal alloys formed from these metals, such as tin/copper alloys. Suitable tin/copper alloys are those comprising from 1 to 99 weight % of tin and from 1 to 99 weight % of copper, preferably from 30 to 99 weight % of tin and from 1 to 70 weight % of copper and more preferably from 50 to 95 weight % of tin and from 5 to 50 weight % of copper.

An especially preferred metal is tin which on oxidation can form tin (II) oxide (SnO) and tin (IV) oxide ($SnO_2$), both of which can be readily reduced to metallic tin. Tin (II) oxide can be reduced to metallic tin with the application of a 1.24 volt electromotive force (e.m.f.) and tin (IV) oxide requires a 2.5 volt e.m.f. to be reduced to tin. When tin is employed as the oxidisable material, the applied electromotive force is typically at least 3 volts.

The tin is preferably combined with a co-metal(s) which forms a catalytic composition with the tin. Suitable metals for this purpose may be selected from rhodium, platinum and palladium, with rhodium being particularly preferred. Without wishing to be bound by any theory, it is believed that the co-metal facilitates the release of oxygen from the tin oxides which are formed, e.g. by feeding electrons into the oxide molecules, and/or is able to absorb the oxides of nitrogen. Thus, other materials which are able to perform one or both of these functions may be used in place of the co-metal. Moreover, if other oxidisable metals are used instead of tin, these may be combined with a co-metal or other material which is able to facilitate the release of oxygen from the metal oxide(s) which is formed and/or which is able to absorb the oxides of nitrogen.

When the co-metal is rhodium, the mole ratio of tin to rhodium is preferably in the range of from 2:1 to 1:4, more preferably around 1:2.

Mixtures of two or more co-metals may be used if desired.

The tin or tin/co-metal combination is also preferably formulated into a composition together with one or more electrically conducting metal oxides which have variable oxidation states. Suitable electrically conducting metal oxides of this type include zirconia and the oxides of the lanthanides, such as the oxides of lanthanum (La), ytterbium (Yb), yttrium (Y), neodymium (Nd), gadolinium (Gd), praseodymium (Pr) and cerium (Ce). Ceria and zirconia are particularly preferred oxides, and combinations of these two oxides are especially preferred.

If other metal or metal/co-metal combinations are used, these are also preferably formulated into a composition together with an electrically conducting oxide which has variable oxidation states.

The amount of oxidisable material which is used in the present invention will preferably be sufficient to reduce substantially all and more preferably all of the $NO_2$. In this way, the effluent composition which exits the reaction chamber will be substantially free of $NO_2$. The amount of oxidisable material which is used will depend, inter alia, on the nature of the oxidisable material, the surface area of the oxidisable material, the amount of effluent to be processed per unit time and the concentration of $NO_2$ in the effluent. Preferably, the loading of the oxidisable material in the reaction chamber will be such as to provide from 20 to 300 mg of the material per $cm^3$ of reaction chamber, more preferably from 70 to 250 $mg/cm^3$ and particularly preferably from 100 to 200 $mg/cm^3$, e.g. around 160 $mg/cm^3$. When the present invention is being applied to the treatment of vehicle exhaust gases, the amount of the oxidisable material should be sufficient to process exhaust gas having a weight hourly space velocity of up to 100,000 per hour ($h^{-1}$). This amount can be readily determined by one skilled in the art by means of routine trials.

The application of the electromotive force is preferably achieved by making the oxidisable material, and any other material(s) with which it is combined, a component in a solid state electrolytic cell which also comprises a metallic component, a solid state electrolyte component arranged in electrical communication with both the metallic component and the oxidisable material, and means for providing an electrical connection to a voltage source.

For the avoidance of doubt, by a metallic component we mean a component which comprises a metal so that it is electrically conducting, but which is not necessarily made exclusively of metal.

In the cell, the metallic component will function as the cell's positive electrode and will also provide a substrate for the solid state electrolyte and the oxidisable material. The oxidisable material, and any other material with which it is combined, will function as the cell's negative electrode and will, therefore, experience a negative bias on application of the electric current.

The metallic component of the electrolytic cell is preferably provided by a plurality of metal containing wires which may be discrete or perhaps loosely consolidated to form a wool. However, in a preferred embodiment the wires will be knitted or otherwise joined together to form an integral wire mass. Other suitable constructions for the metallic component will be apparent to those skilled in the art.

In a preferred embodiment, the metallic component of the electrolytic cell comprises an inner layer or core of a metal and an outer layer or coating of an inorganic oxide which will protect the metal inner layer from the oxidising environment and also provide a suitable surface for the subsequently applied electrolyte. When the metallic component comprises a plurality of wires, as is preferred, each wire will preferably comprise a core of metal and an outer layer of an inorganic oxide.

In an especially preferred embodiment, the metallic component comprises an inner layer or core which is substantially composed of an iron/chromium (Fe/Cr) alloy and an outer layer, on which the electrolyte is deposited, which is substantially composed of alumina and particularly α-alumina. The substrates of this especially preferred embodiment can be prepared by heating an alloy of Fe, Cr and aluminium. (Al), such as Fecralloy, to a temperature of between 600 and 1000° C. in air for about 1 to 4 hours, e.g. around 1000° C. for about 2 hours. In this process, the aluminium tends to migrate to the surface where it is oxidised to form alumina.

The solid state electrolyte will form a layer on the metallic component and will typically comprise a mixture of one or more semi-conducting oxides. In a preferred embodiment, the electrolyte comprises alumina or zirconia, especially zirconia, and one or more oxides of the lanthanides (i.e. rare earth oxides) as a dopant, such as an oxide of lanthanum (La), ytterbium (Yb), yttrium (Y), neodymium (Nd), gadolinium (Gd), praseodymium (Pr) and cerium (Ce). Electrolytes comprising a mixture of zirconia and ceria are particularly preferred with electrolytes comprising a mixture of zirconia, ceria and gadolinia being especially preferred.

The electrolyte will typically comprise from 50 to 80 mole %, particularly from 60 to 75 mole % of the zirconia or alumina and from 20 to 50 mole %, particularly from 25 to 40 mole % of the one or more lanthanide oxides.

The application of an electrolyte layer to the metallic component is preferably achieved by coating a precursor layer from a sol and then heat treating the precursor layer to form the electrolyte layer. The sol is preferably made up by dissolving or dispersing salts or oxides of the various metals contained in the electrolyte layer in the desired proportions in a concentrated nitric acid (c.HNO$_3$)/water mixture. The c.HNO$_3$/water mixture preferably comprises a 1:1 mixture by volume of the c.HNO$_3$ and water. Suitable salts include the carbonates, oxalates, halides, hydroxides and nitrates, with carbonates and nitrates being preferred. Heating may be necessary to effect thorough digestion of the various metal compounds in the c.HNO$_3$/water mixture. When a sol having the desired homogeneity and consistency is obtained, it can be coated onto the metallic component using any appropriate coating technique, such as dipping, spraying or brushing, dipping being a preferred technique. Once the coating has been applied to the metallic component, it is dried and then baked at a temperature in the range of from 300 to 800° C., preferably in the range of from 300 to 600° C. and particularly, in the range of from 300 to 500° C., e.g. around 400° C., to form the electrolyte layer.

In a particularly preferred embodiment, zirconium carbonate is first dissolved in a c.HNO$_3$/water mixture, preferably a 1:1 v/v mixture, followed by the nitrate salt(s) of the selected rare earth metal(s). The resulting composition is then heated to a temperature in the range of from 60 to 100° C. to digest the compounds in the c. HNO$_3$/water mixture. Preferably, temperatures in the range of from 70 to 90° C., e.g. around 80° C., are used to digest the various compounds in the c. HNO$_3$/water mixture. The heating is typically continued for about an hour. After cooling, the sol is coated onto the substrate, e.g. by dipping, the coating dried and then baked at around 400° C. to form the electrolyte layer.

The amounts of the various components making up the sol can be selected to result in the formation of an electrolyte layer having the desired ratio of components.

Without wishing to be bound by any theory, it is believed that the solid state electrolyte removes $O^{2-}$ ions that have reacted with the oxidisable material as a result of the reaction between that material and the NO$_2$. Therefore, the thickness of the electrolyte layer will depend, inter alia, on the number of moles of NO$_2$ to be processed per unit time. This thickness can be readily determined by one skilled in the art.

The oxidisable material, which must be in electrical communication with the solid state electrolyte, will preferably form a continuous layer over the solid state electrolyte layer. This layer should be porous in order to allow for the migration of $O^{2-}$ ions from the oxidisable material to the electrolyte.

The layer of oxidisable material may be applied using coating techniques known in the art. For example, when the oxidisable material is a metal, a preferred technique for applying the layer of oxidisable material is electrodeposition. In this technique, a suitable solution containing the metal as a salt, e.g. an aqueous solution of the nitrate or chloride salt, is deposited as a layer on the electrolyte under high voltage, e.g. around 12 volts. The applied voltage used in electrodeposition will convert the metal salt to the metal and will also ensure that the layer of oxidisable material which is deposited is porous.

When the oxidisable metal is combined with a co-metal and an electrically conducting metal oxide having variable oxidation states, an electrode layer comprising these three components is conveniently formed by applying a precursor layer from a sol and then heat treating this layer to form the electrode layer. The sol is preferably made up by dissolving or dispersing salts or oxides of the various metals contained in the electrode layer in the desired proportions in a concentrated nitric acid (c.HNO$_3$)/water mixture. The c.HNO$_3$/water mixture preferably comprises a 1:1 mixture by volume of the c.HNO$_3$ and water. Suitable salts include the carbonates, oxalates, halides, hydroxides and nitrates. Heating may be necessary to effect thorough digestion of the various metal compounds in the c.HNO$_3$/water mixture. When a sol having the desired homogeneity and consistency is obtained, it can be coated onto the electrolyte layer using any appropriate coating technique, such as dipping, spraying or brushing, dipping being a preferred technique. Once the coating has been applied to the electrolyte layer, it is dried and then baked at a temperature in the range of from 300 to 800° C., preferably in the range of from 300 to 600° C. and particularly in the range of from 300 to 500° C., e.g. around 400° C., to form the electrode layer.

In a particularly preferred embodiment, zirconium carbonate is first dissolved in a c.HNO$_3$/water mixture, preferably a 1:1 v/v mixture, followed by cerium nitrate if the final electrode layer is to contain ceria. The resulting composition is then heated to a temperature in the range of from 60 to 100° C. to digest the compounds in the c.HNO$_3$/water mixture. Preferably, temperatures in the range of from 70 to 90° C., e.g. around 80° C., are used to digest the various compounds. The heating is typically continued for about an hour. Halide, particularly chloride salts of the co-metal and oxidisable metal are then added in turn to the sol with stirring, and once the sol has cooled it is coated onto the electrolyte layer, e.g. by dipping, the coating dried and then baked at around 400° C. to form the electrode layer. If the oxidisable metal and co-metal are tin and rhodium respectively, tin (II) chloride (SnCl$_2$) and rhodium (III) chloride (RhCl$_3$) are preferably used in the formation of the sol.

The regeneration of the oxidisable material in the electrolytic cell is achieved by applying a direct current thereto which is equal to or greater than the reduction potential of the oxide, e.g. metal oxide, which is formed. The positive terminal of the voltage source is connected to the metallic component and the negative terminal is connected to the electrode component comprising the oxidisable material.

Without wishing to be bound by any theory, it is believed that the reduction of the oxide back to the oxidisable form liberates $O^{2-}$ ions which are removed by the solid state electrolyte as a result of the concentration gradient generated by the applied electromotive force. The electromotive force flowing through the metallic component also provides for conversion of the $O^{2-}$, ions to molecular oxygen which is released.

When the device of the first aspect of the present invention is used in automotive applications, the voltage source is conveniently the vehicle battery.

In a preferred embodiment, the electrolytic cell also comprises a porous component interposed between the metallic component and the solid state electrolyte which facilitates the release of the oxygen gas which is generated. This component preferably comprises a layer on the metallic component onto which the electrolyte layer is deposited. In order to ensure electrical communication between the metallic component and the solid state electrolyte, the additional porous component should be electrically conducting, and for this reason is generally fabricated from a metal.

The additional porous component is preferably made of gold and is conveniently formed by electrodeposition in which the gold is deposited as a layer on the metallic component from a solution containing the gold as a salt, e.g. an aqueous solution of the nitrate or chloride salt, under high voltage, e.g. around 12 volts. The applied voltage used will convert the metal salt to the metal and will also ensure that the gold layer has the desired porosity. Alternatively, the porous gold layer may be formed by coating the metallic component with a gold/aluminium alloy to form a layer which is then treated with a chemical reagent such as sodium hydroxide to etch out the aluminium and leave a porous gold layer behind.

In the process of the second aspect of the present invention, the reaction chamber containing the oxidisable material is maintained at a temperature in the range of from 100 to 1000° C. Preferred operating temperatures will depend, inter alia, on the nature of the oxidisable material, on the operating temperature of the electrolyte and on the use to which the process is being put. However, when the oxidisable material is a metal preferred operating temperatures are in the range of from 200 to 600° C., more preferably in the range of from 200 to 500° C. and particularly in the range of from 300 to 400° C., e.g. around 350° C. When the process is employed in automotive applications, the required operating. temperatures are generally maintained by the hot exhaust gas entering the reaction chamber so that a discrete heating source is unnecessary.

The residence time for the effluent composition in the reaction chamber containing the oxidisable material is typically in the range of from 1 to 50 milliseconds, preferably in the range of from 1 to 20 milliseconds, more preferably in the range of from 2 to 10 milliseconds and particularly in the range of from 2 to 8 milliseconds, e.g. about 4 milliseconds.

In a particularly preferred embodiment, the reaction chamber containing the oxidisable material is associated with a further reaction chamber which is arranged upstream of the reaction chamber containing the oxidisable material. This further reaction chamber contains an oxidation catalyst which is able to oxidise nitric oxide (NO) to nitrogen dioxide ($NO_2$) or other nitrogen oxides having a nitrogen oxidation state greater than 2. Thus, effluent compositions such as exhaust gases which contain both NO and $NO_2$ can be passed through the reaction chamber containing the oxidation catalyst where the NO is oxidised to $NO_2$ and then through the reaction chamber containing the oxidisable material where $NO_2$ is reduced to nitrogen.

According to a fifth aspect of the present invention there is provided a device for decomposing nitric oxide (NO) or a nitric oxide (NO)/nitrogen dioxide ($NO_2$) mixture contained in an effluent composition comprising in series a first reaction chamber which contains an oxidation catalyst which is able to oxidise nitric oxide to yield nitrogen dioxide and a second reaction chamber which contains an oxidisable material which is able to reduce nitrogen dioxide to yield nitrogen.

The device of the fifth aspect of the present invention comprises first and second reaction chambers which are arranged in series. When the device is in use, the effluent composition is initially conveyed to the first reaction chamber where the oxidation catalyst contained in the chamber oxidises NO contained in the effluent composition to yield $NO_2$. The oxidised effluent composition then exits the first reaction chamber and passes into the second reaction chamber where the oxidisable material reduces the $NO_2$ contained in the effluent composition to yield molecular nitrogen which can be safely discharged into the atmosphere.

In the device, the first and second reaction chambers are preferably enclosed by a metal shell or casing. The oxidation catalyst contained in the first reaction chamber will preferably form a layer on a metal or ceramic substrate. Conveniently, the oxidation catalyst will form an outer layer on a plurality of wires, particularly metal containing wires, which are loaded into the reaction chamber. Preferably, the wires will be knitted or otherwise joined together to form an integral wire mass, although we do not exclude the possibility that the wires may be discrete or perhaps loosely consolidated to form a wool.

Both reaction chambers are provided with an inlet and outlet for the effluent composition to which conduits for conveying the composition to and from the reaction chambers may be attached. The first and second reaction chambers may be enclosed by the same metal casing and be separated by a partitioning wall which effectively divides the single large chamber enclosed by the metal casing into two. In this embodiment, the partition will be provided with an aperture for allowing the effluent composition to pass from the first to the second reaction chamber.

According to a sixth aspect of the present invention there is provided a process for decomposing nitric oxide (NO) or a nitric oxide (NO)/nitrogen dioxide ($NO_2$) mixture contained in an effluent composition which comprises passing the effluent composition through a first reaction chamber where it is contacted with oxygen in the presence of an oxidation catalyst at a temperature in the range of from 200 to 800° C. so as to oxidise at least a proportion of the nitric oxide contained in the effluent composition to nitrogen dioxide and then through a second reaction chamber where it is contacted with an oxidisable material at a temperature in the range of from 100 to 1000° C. so as to at least partially reduce the nitrogen dioxide to yield nitrogen.

Typically, the effluent composition which enters the first reaction chamber will contain both NO and $NO_2$ so that the effluent composition which enters the second reaction chamber will contain the $NO_2$ originally contained in the effluent composition as well as that generated in the first reaction chamber.

For the avoidance of doubt, although the device and process of the fifth and sixth aspects of the present invention have been defined in relation to NO and $NO_2$, they may be applied to the treatment of nitric oxide (NO) and any oxide of nitrogen in which the nitrogen has an oxidation state greater than 2. For example, the original effluent composition may contain a proportion of nitrogen oxides of nitrogen oxidation states greater than 2 other than $NO_2$. Moreover, a proportion of the NO may also be oxidised in the first reaction chamber to nitrogen oxides of nitrogen oxidation states greater than 2 other than $NO_2$. However, typically, the oxides of nitrogen contained in the original effluent composition will substantially comprise NO and $NO_2$ and the NO which is oxidised in the first reaction chamber will be substantially oxidised to $NO_2$.

In the description which follows, we will continue to use the terms nitrogen dioxide and $NO_2$. However, we do not intend to exclude other oxides of nitrogen in which the nitrogen has an oxidation state greater than 2 unless the context requires otherwise.

The inventions of the fifth and sixth aspects, are particularly concerned with the treatment of gaseous effluent compositions containing NO and $NO_2$, such as plasma effluent gas. More especially, they are concerned with the treatment of exhaust gases produced by automotive combustion engines, particularly lean burn engines, which contain NO and $NO_2$.

The oxidation catalyst which is contained in the first reaction chamber is able to oxidise NO to $NO_2$ and in a preferred embodiment will oxidise substantially all and more preferably all of the NO. In this way, the is effluent composition which enters the second reaction chamber contains $NO_2$, but is substantially free of NO. A suitable oxidation catalyst may be selected from the oxidation catalysts known in the art.

A preferred oxidation catalyst is one comprising an inorganic oxide support which in use provides a source of $O^{2-}$ ions and which is doped or impregnated with one or more metals and/or metal compounds, e.g. metal oxides, which are able to catalyse the reaction between NO and atomic oxygen to generate $NO_2$. The support typically comprises from 85 to 98 weight % and the metal/metal compound from 2 to 15 weight % of the oxidation catalyst. Preferably, the support comprises from 92 to 98 weight %, more preferably from 94 to 98 weight % and the metal/metal compound impregnating the support from 2 to 8 weight %, more preferably from 2 to 6 weight % of the oxidation catalyst.

The inorganic oxide support preferably comprises an oxide of a lanthanide (i.e. a rare earth oxide) and more preferably comprises a mixture of a lanthanide oxide and zirconia or alumina, especially. zirconia. Suitable lanthanide oxides include the oxides of cerium (Ce), praseodymium (Pr), gadolinium (Gd), ytterbium (Yb), yttrium (Y) and neodymium (Nd), such as $Yb_2O_3$, $Gd_2O_3$, $Y_2O_3$, $Ce_2O_3$ and $Nd_2O_3$. Mixtures of lanthanide oxides may be used if desired. Preferred oxides are the oxides of cerium and praseodymium, and in a particularly preferred embodiment the support comprises a mixture of zirconia and an oxide of praseodymium. Preferred supports comprise from 50 to 90 mol % of the zirconia or alumina and from 10 to 50 mol % of the lanthanide oxide.

The support is preferably impregnated with at least one metal or metal oxide selected from palladium, nickel, platinum, rhodium, silver, ruthenium, cobalt, iron, molybdenum, tungsten and the oxides of these metals. Combinations of a metal and metal oxide may also be employed.

Preferably, the support is not only impregnated with one of the above metals or metal oxides, but is also impregnated with a metal or metal compound which is able to function as an electron donor. Suitable electron donating metals and metal compounds include the transition metals, aluminium, zinc and the oxides of these metals, particularly zinc and zinc oxide.

In a preferred embodiment, the support is impregnated with platinum, palladium, a platinum/zinc mixture, a palladium/zinc mixture or an oxide derivative of these materials. In a particularly preferred embodiment, the impregnant is a mixture comprising (A) a metal or metal oxide selected from platinum, palladium and the oxides thereof and (B) zinc or zinc oxide, with mixtures of palladium and zinc or their oxides being especially preferred. In this embodiment, the molar ratio of platinum or palladium to zinc is preferably 1:2.

Oxidation catalysts comprising a support of a rare earth oxide, e.g. praseodymia, together with zirconia or alumina and a platinum or palladium oxide impregnant are conveniently prepared by impregnating the support material with a platinum or palladium salt and then calcining the impregnated support in air at elevated temperatures to convert the salt into the oxide. When the impregnant is a mixture containing the oxides of platinum and zinc or palladium and zinc, the catalyst is conveniently prepared by impregnating the support with a mixture of platinum and zinc or palladium and zinc salts in the appropriate ratio and then calcining as before. The calcination temperature will depend, inter alia, on the type of salt which is used. Suitable salts include the carbonates, oxalates and halides, with nitrates being preferred. When nitrates are used, the calcination temperature is typically in the range of from 500 to 800° C., more preferably in the range of from 550 to 700° C. and particularly around 600° C.

As stated above, the oxidation catalyst preferably comprises a layer, particularly a porous layer, on a metal or ceramic substrate. Substrates comprising an inner layer or core of a metal and an outer layer or coating of an inorganic oxide are particularly preferred, since the inorganic oxide tends to protect the metal inner layer and also provides a suitable surface for the subsequently applied oxidation catalyst. In an especially preferred embodiment, the substrate, which preferably comprises a plurality of wires, comprises an inner layer or core which is substantially composed of an iron/chromium (Fe/Cr) alloy and an outer layer, on which the oxidation catalyst is coated, which is substantially composed of alumina and particularly α-alumina. The substrates of this especially preferred embodiment can be prepared as described previously.

When the oxidation catalyst is a porous layer coated on a substrate, e.g. a wire substrate, a preferred technique for applying the catalyst layer to the substrate is a coating technique in which a precursor layer is applied using a sol and then heat treated. The sol is preferably made up by dissolving or dispersing salts or oxides of the various metals contained in the oxidation catalyst in the desired proportions in a concentrated nitric acid (c.$HNO_3$)/water mixture. The c.$HNO_3$/water mixture preferably comprises a 1:1 mixture by volume of the c.$HNO_3$ and water. Suitable salts include the carbonates, oxalates, halides, hydroxides and nitrates, with nitrates being preferred. Heating may be necessary to effect thorough digestion of the various metal compounds in the c.$HNO_3$/water mixture. When a sol having the desired homogeneity and consistency is obtained, it can be coated onto the substrate using any appropriate coating technique, such as dipping, spraying or brushing, dipping being the preferred technique. Once the coating has been applied to the substrate, it is dried and then baked at a temperature in the range of from 300 to 800° C., preferably in the range of from 300 to 600° C. and particularly in the range of from 300 to 500° C., e.g. around 400° C., to form the catalyst layer.

In a particularly preferred embodiment, zirconium carbonate is first dissolved in a c.$HNO_3$/water mixture, preferably a 1:1 v/v mixture, followed by cerium or praseodymium nitrate. Palladium or platinum nitrate is then added to the mixture optionally together with zinc nitrate and the resulting composition is then heated to a temperature in the range of from 60 to 100° C. to digest the compounds in the c.$HNO_3$/water mixture. Preferably, temperatures in the range of from 70 to 90° C., e.g. around 80° C., are used to digest the various compounds in the c. $HNO_3$/water mixture. The heating is typically continued for about an hour. After cooling, the sol is coated onto the substrate, e.g. by dipping, the coating dried and then baked at around 400° C. to form the catalyst layer.

The amounts of the various components making up the sol can be selected to result in the formation of an oxidation catalyst having the desired ratio of components.

The NO and $O_2$ molecules tend to compete for absorption sites on the surface of the oxidation catalyst. In consequence, when the partial pressure of oxygen in the first reaction chamber is greater than that of NO, as is the case with exhaust gases generated by automotive combustion engines, a proportion of the NO entering the first reaction chamber may not be oxidised in that chamber. However, if the oxidation catalyst comprises a layer on an electrically conducting substrate, such as a metal substrate or a substrate comprising an inner layer or core of a metal and an outer layer or coating of an inorganic oxide, an electromotive force with a negative bias can be passed through the substrate and thus through the oxidation catalyst in order to promote the absorption of NO and discourage the absorption of $O_2$ on the catalyst surface. This process of preferentially encouraging the absorption of one or more components of a reactive gas stream onto the surface of a catalyst while simultaneously discouraging the absorption of one or more other components is of more general applicability.

Accordingly, in a further aspect of the present invention there is provided a device for effecting a chemical reaction comprising a reaction chamber, a catalyst material for the chemical reaction which is contained in the reaction chamber and which forms a layer or coating on an electrically conducting, e.g. a metal or metal containing substrate and means for applying an electromotive force to the catalyst material via the electrically conducting substrate so as to modify the absorption characteristics of the catalyst material.

The present invention also provides a process for modifying the absorption characteristics of a catalyst material contained in a reaction chamber through which a reactant stream containing one or more reactants wand optionally one or more further components is being passed, which process comprises applying an electromotive force to the catalyst material so as to promote the absorption of one or more of the reactants and discourage the absorption of one or more of the other reactants or other components.

The oxidation catalyst or other catalytic material is conveniently coated on an electrically conducting substrate, such as an electrically conducting plate or an arrangement of electrically conducting wires,. which is sandwiched between two electrically conducting plates and insulated therefrom. The catalytic assembly is also provided with means for connection to a voltage source. In use, the connections to the voltage source are such as to supply the central electrically conducting substrate which supports the catalyst with a negative charge and the outer electrically conducting plates with a positive charge. The insulation between the central and outer electrically conducting components will prevent shorting. The substrate supporting the catalyst and the outer electrically conducting plates conveniently comprise a metal core and an outer layer or coating of an inorganic oxide, such as an alumina coated Fecralloy alloy. The preparation of these latter substrates has been described supra.

The amount of oxidation catalyst contained in the first reaction chamber will depend, inter alia, on the nature of the catalyst, the surface area of the catalyst, the amount of effluent composition to be processed per unit time and the concentration of NO in the effluent composition. Preferably, the loading of the oxidation catalyst in the first reaction chamber will be such as to provide from 1 to 10 mg of catalyst per $cm^3$ of reaction chamber, more preferably from 1 to 5 mg/$cm^3$ and particularly preferably from 1 to 3 mg/$cm^3$, e.g. around 2 mg/$cm^3$. When the present invention is being applied to the treatment of vehicle exhaust gases, the amount of catalyst should be sufficient to process exhaust gas having a weight hourly space velocity of up to 100,000 per hour ($h^{-1}$). This amount can be readily determined by one skilled in the art by means of routine trials.

In the process of the present invention, the first reaction chamber is maintained at a temperature in the range of from 200 to 800° C. Preferred operating temperatures in the first reaction chamber will depend, inter alia, on the nature of the oxidation catalyst and on the use to which the process is being put. However, preferred operating temperatures are in the range of from 250 to 600° C., more preferably in the range of from 250 to 450° C. and particularly in the range of from 350 to 450° C., e.g. 400° C. When the process of the present invention is employed in automotive applications, the required operating temperatures in the first reaction chamber are generally maintained by the hot exhaust gas entering the reaction chamber so that a discrete heating source is unnecessary.

The residence time for the effluent composition in the first reaction chamber is typically in the range of from 1 to 50 milliseconds, preferably in the range of from 1 to 20 milliseconds, more preferably in the range of from 2 to 10 milliseconds and particularly in the range of from 2 to 8 milliseconds, e.g. about 4 milliseconds.

The present invention is now illustrated but not limited with reference to the following examples.

EXAMPLE 1

In this example, the conversion of NO to $NO_2$ by a range of oxidation catalysts was investigated.

The oxidation catalysts comprised an inorganic oxide support of zirconia ($ZrO_x$) stabilised with 16 weight % praseodymium oxide ($PrO_x$) and an impregnant selected from the following:

(1) Platinum oxide
(2) Palladium oxide
(3) A mixture of platinum and zinc oxides (platinum:zinc ratio 1:2)
(4) A mixture of palladium and zinc oxides (palladium:zinc ratio 1:2)

Catalyst samples were prepared by impregnating the support with a 3 weight % solution of platinum or palladium nitrate. The bimetallic systems were prepared by the further addition of a 3 weight % solution of zinc nitrate in an amount to give a noble metal:zinc ratio of 1:2. The catalyst samples were then calcined in air at 600° C. to convert the metal salts to their oxides. The final catalyst compositions contained 3 weight % of noble metal. 0.5 g of each catalyst composition was loaded into the reactor for the experiments.

A feed stream gas composition comprising 3.7 molar % NO (BOC Gases) and 18.5 molar % oxygen (Air Products) in a nitrogen carrier gas (BOC Gases) was fed to the reactor. The volume hourly space velocity for the feed stream gas was set at 90,000 h$^{-1}$ giving a catalyst retention time of 40 milliseconds. The reactor temperature was fixed at 400° C. during the experiments.

Analysis of the product stream exiting the reactor was performed using an on-line gas chromatograph (Perkin-Elmer Autosystem XL fitted with an Altech Chemisorb MP1-100/120 column). The results are given in Table 1 below.

TABLE 1

| Catalyst | NO peak area ($\mu$V.s) | NO$_2$ peak area ($\mu$V.s) | Conversion % |
|---|---|---|---|
| Pt/PrO$_x$—ZrO$_x$ | 279592 | 153596 | 35 |
| Pt—Zn/PrO$_x$—ZrO$_x$ | 497137 | 197889 | 28 |
| Pd/PrO$_x$—ZrO$_x$ | 283642 | 75398 | 21 |
| Pd—Zn/PrO$_x$—ZrO$_x$ | 298999 | 204376 | 41 |

The above results show that all the catalysts investigated converted NO to NO$_2$, but of the catalysts investigated the Pd—Zn/PrO$_x$—ZrO$_x$ catalyst had the highest activity.

EXAMPLE 2

In this example, the optimum reaction temperature for the conversion of NO to NO$_2$ was investigated.

The catalyst used for this investigation comprised a support of zirconia stabilised with 16 weight % praseodymium oxide and an impregnant comprising a mixture of palladium and zinc oxides (palladium:zinc ratio 1:2). The catalyst was prepared as described in Example 1. The final catalyst contained 3 weight % of palladium and 0.5 g of the catalyst was charged to the reactor for the experiment.

The feed stream gas used in this example was as described in Example 1 and the volume hourly space velocity of the gas was 90,000 h$^{-1}$. The temperature of the reactor was increased as a function of time to 400° C. and the product stream exiting the reactor was analysed at various temperatures using an on-line gas chromatograph as described in Example 1. The NO peak area was standardised in order to obtain the relative partial pressure of NO$_2$ generated under the reaction conditions. The results are given in Table 2 below.

TABLE 2

| Reactor Temp (° C.) | NO$_2$ Peak Area ($\mu$V.s) | Relative % increase |
|---|---|---|
| 31 | 227971 | — |
| 300 | 408407 | 79 |
| 400 | 457146 | 100 |

The above results show that the partial pressure and hence amount of NO$_2$ generated by the catalyst is a function of the reaction temperature.

EXAMPLE 3

In this example, the efficiency of the Pd—Zn/PrO$_x$—ZrO$_x$ catalyst prepared as described in Example 1 to convert NO to NO$_2$ was investigated at a reaction temperature of 400° C. and where the partial pressure of oxygen was equal to the partial pressure of NO. A feed stream gas comprising 3.7 molar % NO and 3.7 molar % oxygen in a nitrogen carrier gas (Gas Stream B) was fed to a reactor at a volume hourly space velocity of 45,000 h$^{-1}$. As a control, a feed stream gas comprising 3.7 molar % NO in a nitrogen carrier gas (Gas Stream A) was also fed to a reactor at a volume hourly space velocity of 45,000 h$^{-1}$. The catalyst contained 3 weight % of the palladium and 0.5 g of the catalyst was charged to the reactor for the experiment. The results are given in Table 3 below.

TABLE 3

| Gas Stream | NO Peak Area ($\mu$V.s) | % Conversion |
|---|---|---|
| A | 298106.52 | — |
| B | 15037.41 | 94.95 |

The results show that the catalyst is potentially highly efficient in the conversion of NO to NO$_2$ under lean burn conditions. Maximum conversion is a function of reaction temperature and the relative partial pressures of NO and O$_2$ respectively.

EXAMPLE 4

A reactor was loaded with granulated metallic tin (0.5g, 4.2 mmol, Aldrich Chemicals). The reactor temperature was maintained at 250° C. and a feed stream gas comprising NO$_2$ in a nitrogen carrier gas was passed through the reactor at a volume hourly space velocity of 45,000 h$^{-1}$. Over the fresh tin sample 56% of the eluent NO$_2$ was decomposed to N$_2$. Examination of the retrieved tin sample showed surface darkening of the shiny metallic tin. This surface darkening is consistent with oxidation of the metal.

This example was repeated twice except that the reactor was loaded with 1.5 g and 3.5 g of fresh tin metal respectively. It was found that increasing the charge of tin resulted in a reduction of the amount of NO$_2$ detected in the effluent gas With 3.5 g of tin, virtually no NO$_2$ was detected in the effluent.

EXAMPLE 5

In this example, the effect of applying a negative charge potential to the oxidation catalyst bed used for converting the NO to NO$_2$ was investigated.

A reactor comprising the oxidation catalyst was constructed as follows.

Three Fecralloy (an alloy of Fe, Cr and Al) metal plates having a thin alumina coating over the surface of the plates were prepared by calcining Fecralloy plates in air at 600° C. over a 3 hour period.

Zirconium carbonate (346 g, 1.64 moles, MEL Chemicals, Manchester) was slowly added to 150 mls of a 1:1 solution of concentrated nitric acid in water with stirring and then digested at 80° C. for 2 hours. Cerium nitrate hexahydrate (104.21 g, 0.24 moles, Aldrich Chemical Co.) was then added to the digested mixture with stirring and the resulting mixture was digested once again at 80° C. for 1 hour with stirring. Palladium nitrate and zinc nitrate were then added to the mixture in an amount to give a 3 weight % loading of the palladium in the final catalyst composition and a palladium:zinc mole ratio of 1:2, and the resulting composition was heated at 80° C. for an hour to digest the palladium and zinc compounds in the c.HNO$_3$/water mixture. After cooling, the sol was coated onto one of the Fecralloy plates by dipping, the coating dried and then baked at 400° C. to form the catalyst layer.

The Fecralloy plate comprising the catalyst layer was then assembled into a cell together with the other two Fecralloy plates. The plate containing the catalyst layer was sandwiched between but spaced apart from the other two plates and electrically isolated therefrom by means of insulating bars. The complete assembly was then arranged in a silica reactor equipped with fluid entry and exit conduits so that the effluent gas composition could flow through the gaps between the outer and central Fecralloy plates. The reactor was also fitted with electrical leads for connection to a voltage generator so as to supply the central Fecralloy plate supporting the oxidation catalyst with a negative charge and the outer Fecralloy plates with a positive charge or vice versa.

The reactor was connected to the voltage source and a feed stream gas composition comprising a helium carrier gas (BOC Gases), 10% NO (BOC Gases), and 5% oxygen (Air Products), based on the total amount of the gases, was fed to the reactor where it contacted the charged oxidation catalyst at a temperature of 360° C. The gas composition was determined by calibration of mass flow controllers (Brooks model 5805) and was controlled by the same means. The feed rate for the NO/helium mixture was set at about 48 $cm^{-3}$ $min^{-1}$, giving a NO feed rate of about 4.8 $cm^{-1}$ $min^{-1}$, and the oxygen feed rate was set at about 2.4 $cm^{-3}$ $min^{-1}$.

Analysis of the product stream exiting the reactor was performed using an on-line gas chromatograph (Perkin-Elmer Autosystem XL fitted with an Altech Chemisorb MP1-100/120 column). The results of passing the feed stock gas composition through the reactor are given in Table 4 below.

TABLE 4

| Charge Applied | Voltage Applied | NO$_2$ Peak Intensity $\mu V$'s | % Change |
|---|---|---|---|
| None | 0 | 444,848 | — |
| +ve | 30 V | 457,729 | 2.9 |
| −ve | 30 V | 687,115 | 54.5 |

The results show that a 54% increase in the partial pressure of $NO_2$ was observed when a 30 volt (19 amp) negative charge was applied to the Fecralloy plate carrying the oxidation catalyst compared to that obtained when no voltage was applied. Thus, the catalyst selectivity was modified and improved by the application of the negative charge.

EXAMPLE 6

In this example, the conversion of NO to $NO_2$ and the subsequent reduction of the $NO_2$ to nitrogen and oxygen using a two stage reactor system was investigated.

The first stage reactor was exactly the same as the reactor described in Example 5.

The second stage reactor comprised an electrolytic cell and was constructed as follows.

A Fecralloy mesh having a thin alumina coating over the wires was prepared by calcining a Fecralloy mesh in air at 600° C. over a 3 hour period. The final mesh weighed 8.38 g and would function as the anode in the final electrolytic cell.

Zirconium carbonate (346 g, 1.64 moles, MEL Chemicals, Manchester) was slowly added to 150 mls of a 1:1 solution of c. nitric acid in water with stirring and then digested at 80° C. for 2 hours. Cerium nitrate hexahydrate (104.21 g, 0.24 moles, Aldrich Chemical Co.) was then added to the digested mixture with stirring together with gadolinium nitrate hexahydrate (59.1 g, 0. 131 moles, Aldrich Chemical Co.) and the resulting mixture was digested at 80° C. for 1 hour with stirring. The mixture was then cooled to room temperature and the resulting gadolinium/cerium/zirconium sol was coated onto the Fecralloy mesh and baked out in air at 400° C. for 2 hours. The coating/bake out process was repeated three times to obtain an electrolyte layer of suitable thickness.

A tin electrode (cathode) was then electroplated onto the baked out electrolyte layer. Tin (II) chloride (1 g, $5.3 \times 10^{-3}$ moles, Aldrich Chemical Co.,) was dissolved in 200 $cm^3$ of 0.1 M HCl. The electrolyte coated Fecralloy alloy mesh was then immersed in the tin (II) chloride solution and a D.C. voltage of 25V was applied over a period of 120 minutes until a deposition of tin was apparent on the surface of the electrolyte. A total of 0.3 g ($2.53 \times 10^{-3}$ moles) of tin was deposited. The tin electrode was then dried in air at 50° C. prior to assembly in a reactor.

The tin electrode assembly was then housed in a silica reactor to form the second stage reactor. This reactor was also provided with electrical leads for connection to a voltage generator so as to place the tin electrode under a negative charge potential and the Fecralloy mesh under a positive charge potential.

The second stage reactor was then connected in series by an arrangement of fluid conduits to the first stage reactor described above so that the feed stream gas passed firstly through the first stage reactor and then through the second stage reactor.

The first and second stage reactors were connected to their respective voltage sources and a feed stream gas composition comprising a helium carrier gas (BOC Gases), 10% NO (BOC Gases), based on the total amount of helium and NO, and variable amounts of oxygen (Air Products) was fed to the two stage reactor system and passed sequentially through the first stage reactor, where it contacted the negatively charged oxidation catalyst at a temperature of 360° C., and then through the second stage reactor, where it contacted the negatively charged tin electrode assembly at a temperature of 200° C. The gas composition was determined by calibration of mass flow controllers (Brooks model 5805) and was also controlled by the same means. The feed rate for the NO/helium was set at about 48 $cm^{-3}$ $min^{-1}$.

The effluent composition, after passage of the feed stream through the two stage reactor, was analysed using a Perkin-Elmer Gas Chromatograph AutoXL fitted with an Alltech Molecular Sieve 5A 800-100 column which was able to separate the $NO_2$, $O_2$ and $N_2$ constituents respectively.

The results of passing the feed stream gas composition through the two stage reactor are given in Table 5.

From Table 5, it is evident that when the partial pressure of oxygen is high (ca 63 min) the amount of nitric oxide detected in the effluent gas is at a minimum, and when the partial pressure of oxygen is low, the partial pressure of nitric oxide detected in the effluent gas is high (ca 89 min.).

At reaction times below 43 minutes, the system is running oxygen depleted and the formation of oxides of nitrogen having oxidation states greater than 2 relies on reducing the oxide content of the catalytic support.

The reduction in the nitrogen partial pressure as a function of time by the tin electrode under constant applied voltage is measured as 0.16% $min^{-1}$. This represents an increase in the efficiency of the electrode of 36% compared to the tin metal alone (i.e. without the applied voltage) which, under the same experimental conditions, gives a deactivation parameter of 0.45% min$^{-1}$.

EXAMPLE 7

In this example, the conversion of NO to $NO_2$ and the subsequent reduction of the $NO_2$ to nitrogen and oxygen using a two stage reactor system was investigated.

Exactly the same apparatus and procedure as described in Example 6 was employed except that the tin electrode was replaced with an electrode Composition comprising a tin/rhodium couple and a combination of ceria and zirconia and the reaction temperature in the second stage reactor was raised to 360° C.

This electrode layer was prepared as follows.

Zirconium carbonate (346 g, 1.64 moles, MEL Chemicals, Manchester) was slowly added to 150 mls of a 1:1 solution of c. nitric acid in water with stirring and then digested at 80° C. for 2 hours. Cerium nitrate hexahydrate (104.21 g, 0.24 moles, Aldrich Chemical Co.) was then added to the digested mixture with stirring and the resulting mixture was digested once again at 80° C. for 1 hour with stirring. Rhodium (III) chloride (0.47 g, 2.23×10$^{-3}$ mol, Aldrich Chemical Co) and tin (II) chloride (0.85 g, 4.48×10$^{-3}$ mol, Aldrich Chemical Co) were then added in turn to the digested mixture with stirring and the resulting mixture was maintained at 80° C. for about an hour to ensure thorough dissolution of the rhodium and tin salts in the $HNO_3$/water mixture. The mixture was then allowed to cool and the resulting sol used to coat the electrolyte coated Fecralloy mesh by immersing the mesh in the sol. The coating was then dried and fired in air at 400° C. for 2 hours.

The results of passing the feed stream gas composition through the two stage reactor are given in Table 6.

The results show that the Rh-Sn couple with an applied 25 volt negative polarity is able to convert $NO_2$ to nitrogen and oxygen.

Prior to t=123 minutes, the amount of NO is in a stoichiometric excess relative to the oxygen.

At t=138 minutes, the $NO/O_2$ ratio is changed to an oxygen excess as evidenced by the peak in the oxygen partial pressure. This excess of oxygen enhances the ability of the two stage reactor to generate nitrogen in the eluent mixture. In addition, the amount of NO falls again to background values.

Overall, the conversion of nitric oxide is found to be greater for Rh-Sn (ca 92±15%) relative to Sn (ca 49±35%).

Applying a positive bias to the polarity of the Rh-Sn electrode produces a catastrophic effect on the functioning of the electrode. Under the application of a negative bias the catalytic electrode shows good activity to the formation of nitrogen, but when the positive bias is applied to the Rh-Sn electrode at t=185 minutes, the capacity of the system to produce nitrogen is lost and the eluent composition is mainly nitrogen dioxide and higher oxidation states of nitrogen oxides. Reversal of the polarity back to a negative bias does not reconstitute the ability of the electrode to convert the $NO_2$ feed stream to nitrogen. However, reducing the electrode in hydrogen or refiring the electrode to 400° C. can return the activity of the electrode.

TABLE 5

| Run Time (mins) | $O_2$ Flowrate (cm$^3$/min) | Change in % $O_2$ | % $O_2$ In Effluent Composition | % $N_2$ In Effluent Composition | NO Flowrate (cm$^3$/min) | % NO | O/N ratio | % Conversion NO | Applied Voltage (V) |
|---|---|---|---|---|---|---|---|---|---|
| 0 | 0 | +1 | 1.0 | 33.1 | 4.8 | 64.9 | 1 | 36 | 12 |
| 29 | 0 | +1 | 1.0 | 29.9 | 4.8 | 68.6 | 1 | 31 | 12 |
| 40 | 1 | −7.6 | 9.9 | 57.8 | 4.7 | 32.3 | 2.9 | 68 | 12 |
| 52 | 2 | +28.3 | 58.3 | 36.7 | 4.6 | 5.0 | 3.7 | 95 | 12 |
| 63 | 3 | +36.1 | 76.0 | 22.2 | 4.5 | 1.7 | 4.7 | 98 | 12 |
| 89 | 4 | −46.7 | 1.0 | 18.2 | 4.4 | 80.8 | 4.6 | 19 | 25 |
| 113 | 0 | +22 | 21.5 | 78.5 | 4.8 | 100 | 1 | 0 | 25 |

TABLE 6

| Run Time (mins) | $O_2$ Flowrate (cm$^3$/min) | % $O_2$ In Effluent Composition | Change in % $O_2$ | % $N_2$ In Effluent Composition | NO Flowrate (cm$^3$/min) | % NO | % Conversion NO | O/N ratio | Electrical Bias (25 v) |
|---|---|---|---|---|---|---|---|---|---|
| 0 | 0 | 11.19 | +11 | 87.9 | 4.8 | 1.0 | 99 | 1 | −ve |
| 12 | 1 | 15.23 | −2.3 | 83.7 | 4.7 | 1.0 | 99 | 1.9 | −ve |
| 25 | 2 | 28.4 | −1.9 | 69.8 | 4.6 | 1.7 | 98 | 2.7 | −ve |
| 123 | 4 | 29.8 | −18.6 | 66.9 | 4.4 | 3.3 | 96.7 | 4.6 | −ve |
| 138 | 18 | 88.4 | +2.2 | 11.5 | 3.0 | 0.1 | 99.8 | 25 | −ve |
| 150 | 0 | 2.4 | +2.4 | 95.3 | 4.8 | 2.3 | 97.7 | 1 | −ve |
| 185 | 0 | 22.7 | +22.4 | 77.6 | 4.8 | 0 | 100 | 1 | +ve |
| 197 | 0 | 22.4 | +22.4 | 77.0 | 4.8 | 0 | 100 | 1 | +ve |
| 213 | 0 | 0.75 | +0.7 | 64.6 | 4.8 | 35 | 65 | I | +ve |
| 229 | 0 | 0.6 | +0.6 | 60.0 | 4.8 | 40 | 60 | 1 | +ve |

What is claimed is:

1. A process for decomposing nitrogen (II) oxide or a mixture containing nitrogen (II) oxide and/or a nitrogen oxide of nitrogen oxidation state greater than 2 contained in an effluent composition which process comprises the steps of:

(a) passing the effluent composition through a first reaction chamber where the effluent composition is contacted with oxygen in the presence of an oxidation catalyst at a temperature range of from 200 to 800° C. and at least a proportion of the nitrogen (II) oxide is oxidized to a nitrogen oxide having a nitrogen oxidation state of greater than 2; and (b) thereafter passing said effluent composition through a second reaction chamber where said oxidized effluent composition is contacted with an oxidisable material at a temperature in the range of from 100 to 1000° C., and reduces at least a portion of the nitrogen oxides having a nitrogen oxidation state of greater than 2 to produce molecular nitrogen and a reduceable oxide of said oxidation material; and wherein an electromotive force is applied across the oxidation catalyst when the effluent composition is passed through the first reaction chamber.

2. A process as claimed in claim 1, with provision that the effluent composition is substantially free of added ammonia.

3. A process as claimed in claim 1, wherein an electromotive force is applied across the oxidation catalyst when the effluent composition is passed through the first reaction chamber.

4. A process as claimed in claim 3, wherein the electromotive force is an alternating current having a negative bias.

5. A process as claimed in claim 1, wherein an electromotive force is applied across the oxidisable material in the second reaction chamber.

6. A process as claimed in claim 5, wherein electromotive force applied to the oxidisable material is a direct current which regenerates the oxidisable material.

7. A process as claimed in claim 1, wherein an electromotive force is applied to the oxidisable material substantially only when the effluent composition is present in the second reaction chamber.

8. A process for decomposing nitrogen (II) oxide or a mixture containing nitrogen (II) oxide and/or a nitrogen oxide of nitrogen oxidation state greater than 2 contained in an effluent composition which process comprises the steps of:

(a) passing the effluent composition through a first reaction chamber where the effluent composition is contacted with oxygen in the presence of an oxidation catalyst at a temperature range of from 200 to 800° C. and at least a proportion of the nitrogen (II) oxide is oxidized to a nitrogen oxide having a nitrogen oxidation state of greater than 2; and (b) thereafter passing said effluent composition through a second reaction chamber where said oxidized effluent composition is contacted with an oxidisable material at a temperature in the range of from 100 to 1000° C., and reduces at least a portion of the nitrogen oxides having a nitrogen oxidation state of greater than 2 to produce molecular nitrogen and a reduceable oxide of said oxidation material; and wherein an electromotive force is applied to the oxidisable material substantially only when the effluent composition is present in the second reaction chamber.

9. A process as claimed in claim 8, with provision that the effluent composition is substantially free of added ammonia.

10. A process as claimed in claim 8, wherein an electromotive force is applied across the oxidation catalyst when the effluent composition is passed through the first reaction chamber.

11. A process as claimed in claim 10, wherein the electromotive force is an alternating current having a negative bias.

12. A process as claimed in claim 8, wherein an electromotive force is applied across the oxidisable material in the second reaction chamber.

13. A process as claimed in claim 12, wherein electromotive force applied to the oxidisable material is a direct current which regenerates the oxidisable material.

14. A process for decomposing nitrogen (II) oxide or a mixture containing nitrogen (II) oxide and/or a nitrogen oxide of nitrogen oxidation state greater than 2 contained in an effluent composition which process comprises the steps of:

(a) passing the effluent composition through a first reaction chamber where the effluent composition is contacted with oxygen in the presence of an oxidation catalyst at a temperature range of from 200 to 800° C. and at least a proportion of the nitrogen (II) oxide is oxidized to a nitrogen oxide having a nitrogen oxidation state of greater than 2; and (b) thereafter passing said effluent composition through a second reaction chamber where said oxidized effluent composition is contacted with an oxidisable material at a temperature in the range of from 100 to 1000° C., and reduces at least a portion of the nitrogen oxides having a nitrogen oxidation state of greater than 2 to produce molecular nitrogen and a reduceable oxide of said oxidation material;

wherein an electromotive force is applied across the oxidisable material in the second reaction chamber; and wherein electromotive force applied to the oxidisable material is a direct current which regenerates the oxidisable material.

15. A process as claimed in claim 14, with provision that the effluent composition is substantially free of added ammonia.

16. A process as claimed in claim 14, wherein an electromotive force is applied across the oxidation catalyst when the effluent composition is passed through the first reaction chamber.

17. A process as claimed in claim 16, wherein the electromotive force is an alternating current having a negative bias.

18. A device for decomposing a nitrogen (II) oxide or a mixture of nitrogen (II) oxide and a nitrogen oxide of nitrogen oxidation state greater than 2 in a gaseous effluent composition wherein said device comprises;

a first reaction chamber containing an oxidation catalyst which, in use, oxidizes said nitrogen (II) oxide to nitrogen (IV) oxide and/or an oxide of nitrogen having a nitrogen oxidation state of more than 2 and a second reaction chamber formed and arranged in series with said first reaction chamber, wherein the second reaction chamber contains an oxidisable material which, in use, reduces said nitrogen (IV) oxide and/or the nitrogen oxides having a nitrogen oxidation state of more than 2 from said first reaction chamber to produce molecular nitrogen and said oxidisable material is oxidized to a reduceable oxide thereof;

wherein said oxidation catalyst comprises an inorganic oxide support which is impregnated with one or more metals and/or metal compounds; and wherein said support comprises from 85 to 98 wt % of the metal or metal compound and from 2 to 15 wt % of the total weight of the oxidation catalyst.

19. A device as claimed in claim 18, wherein the support comprises an oxide of a lanthanide.

20. A device as claimed in claim 18, wherein the support comprises a mixture of an oxide of a lanthanide and zirconia.

21. A device as claimed in claim 20, wherein said support comprises from 50 to 90 mol % zirconia and from 10 to 50 mol % of said oxide of a lanthanide.

22. A device as claimed in claim 21 wherein said oxide of a lanthanide comprises ceria and/or gadolinia.

23. A device as claimed in claim 22, wherein said support comprises about 81.6 wt % zirconia, 11.9 wt % ceria and 6.5 wt % gadolinia.

24. A device as claimed in claim 18, wherein said metal and/or metal compounds are one or more of platinum, palladium, a platinum/zinc mixture, a palladium/zinc mixture or an oxide derivative thereof.

25. A device as claimed in claim 24, wherein the molar ratio of the platinum or palladium to zinc is 1:2.

26. A device as claimed in claim 18, wherein the support is impregnated with at least one other metal or metal oxide selected from the group consisting of nickel, rhodium, silver, ruthenium, cobalt, iron, molybdenum and tungsten.

27. A device as claimed in claim 18, wherein said support is formed and arranged to form a layer on a metal or ceramic.

28. A device as claimed in claim 27, wherein said ceramic is electrically conductive.

29. A device as claimed in claim 18, wherein an electromotive force is applied to the oxidation catalyst.

30. A device as claimed in claim 29, wherein the electromotive force is an alternating current.

31. A device as claimed in claim 30, wherein the electromotive force has a negative bias to promote the absorption of nitrogen (II) oxide by the oxidation catalyst.

32. A device as claimed in claim 18, wherein said oxidisable material comprises a metal.

33. A device as claimed in claim 32, wherein the metal comprises tin.

34. A device as claimed in claim 32, wherein the metal forms a catalytic composition with a co-metal selected from the group consisting of rhodium, platinum and palladium.

35. A device according to claim 32 wherein the oxidisable material forms a layer on a support comprising an oxide of a lanthanide.

36. A device according to claim 18, wherein said oxidisable material forms a layer on a plurality of wires.

37. A device according to claim 18, wherein said oxidisable material has an electromotive force applied thereacross.

38. A device as claimed in claim 37, wherein said electromotive force is a direct current, which, in use, facilitates reduction of the oxidisable material.

* * * * *